Patented June 17, 1930

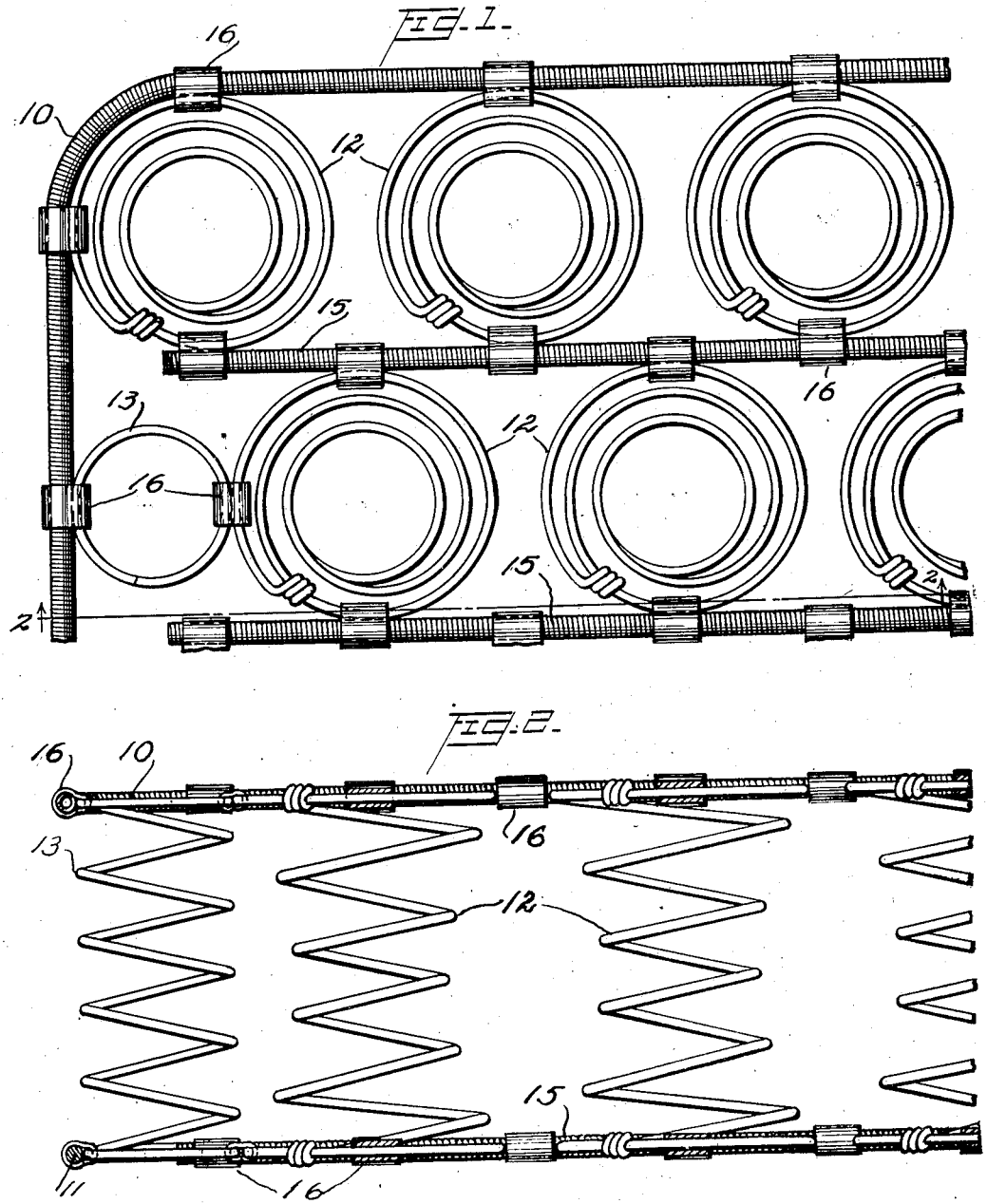

1,765,044

UNITED STATES PATENT OFFICE

HARRY E. WOLF, OF PITTSBURGH, PENNSYLVANIA, ASSIGNOR TO FORT PITT BEDDING COMPANY, OF PITTSBURGH, PENNSYLVANIA, A CORPORATION OF PENNSYLVANIA

SOFT SPRING CUSHION

Application filed March 10, 1928. Serial No. 260,628.

This invention relates to soft spring cushions; and it has particular reference to resilient connecting means extending between rows of helical springs customarily used in such cushions, and, specifically, the invention resides in the provision of a spring skeleton for a seat, mattress, or the like, including a frame, a plurality of helical springs disposed in rows on the frame, with the springs in each row staggered with respect to the springs in the next row, and a small helix or coiled tubing of wire disposed in a substantially straight line in each row, contacting tangentially with the springs at their upper (and lower) edges, and being clipped or otherwise connected to the springs at the points of contact; all as more fully hereinafter set forth and as claimed.

Spring skeletons for cushion seats, mattresses, pads, and the like have heretofore been made by forming two border rims of heavy wire in rectangular form, one for the top and the other for the bottom of the skeleton, placing cross bars between opposite sides of the bottom frame, mounting helical springs on the cross bars, and connecting the springs by clips to the top frame and, in some cases, to each other.

It is difficult to make a spring skeleton of sufficient durability to have long life which is also as soft or flexible as could be desired. Failure in skeletons of this kind usually results from a permanent deformation of one or more springs which produce a bulge on the upholstered finish, thereby causing unevenness and lack of comfort. Usually the upholstery is punched through soon after a bulge is formed, and the complete article is practically unserviceable and unsightly. Such failures may result either from the employment of springs which are not strong enough to withstand the load imposed on them, or may be caused by the use of springs that are too strong, and hence not sufficiently flexible. In a word, a proper balance is difficult to obtain.

I have found that good balance, that is, softness and comfort coupled with durability and permanence, may be obtained by using a special type of connector between the springs and by staggering the springs instead of having them aligned in two directions. This connector consists of a tubing of coiled wire, which is highly flexible, and which is positioned between adjacent rows of springs so that a tangential contact is obtained at diametrically opposed points of each spring. Clips are provided at the points of contact to secure the tubing to the springs. These lengths of tubing do not overlap each other, and are flush with the tops and bottoms of the springs. Such construction causes the entire body of springs to bend toward the point of application of the load in a single direction, rather than in two directions, as would be the case with the cross-connectors heretofore proposed.

The tensions in the rows of springs are in the same direction, and, due to the resiliency of the tubing, the entire structure is brought to a normal position as soon as the load is released, permanent deformations and bulges thereby being avoided.

An embodiment of the invention is illustrated in the accompanying drawing, wherein;

Fig. 1 is a fragmentary plan view of a spring skeleton including the connecting means; and Fig. 2 is a view taken along the line 2—2 of Fig. 1.

The construction includes upper and lower continuous rims 10 and 11 forming the margins of the skeleton, and within and between which are disposed a plurality of rows of helical springs 12 and 13. The upper rim 10 is formed of a continuous flexible tubing of coiled wire, while the lower rim 11 is formed of rigid solid metal. Such construction, particularly when employed in a spring mattress, permits of a greater degree of flexibility and softness than would be the case if two rigid rims were used. It will be understood, of course, that the use of tubing for the rims depends upon the nature of the final article, and the use to which it is placed.

The springs 12 and 13 are formed of coils of wire, and may be of the hour-glass type, or conical, cylindrical, etc. It is advantageous to stagger the springs in adjacent rows, as illustrated, and to make the springs 13 smaller than the springs 12. These small springs are placed only at the ends of the rows to act as fillers and to prevent deformation at the end portions. It will be noted that no cross bars are included in the skeleton, their necessity for many purposes being eliminated by the provision of the connecting tubing.

Between each row of springs, and in the planes of the frames, are placed lengths of coiled wire tubing 15, similar to the tubing used for the upper frame member 10. Each length of tubing alternately contacts tangentially with the springs in adjacent rows and extends, except for negligible variations, in practically a straight line. Each spring 13 is accordingly in tangential contact with parallel lengths of tubing 15, the contacts being at opposite points of end diameters. The tubing 15 is secured flush with the ends of the springs 12 by means of encircling bands or clips 16, which are simply positioned around the spring wire and tubing and crimped into place. The small springs 13 are also secured by clips 16.

It will be observed that when any spring is compressed, all springs in the same row are drawn over toward the point of depression in a straight line, the direction of which is determined by the parallel lengths of tubing 15. In this respect, the connectors act differently than cross-connected resilient clips, which grip the end of each spring radially at four points, instead of two. Much of the harshness inherent in cross-connected clips is avoided, but because of the long line of action through which the tubing 15 acts, recovery is quick and complete when the load is removed, and bulges are overcome.

A convenient way of making this skeleton is to form it untempered in the shape shown, and then to subject the assembly to a proper heat treatment to relieve strains and to insure the character of resiliency desired. Such procedure is more satisfactory then to assemble heat-treated elements, which cannot be done without the development of strains in the finished article.

What I claim is:—

A spring skeleton for cushion seats, mattresses, and the like, comprising upper and lower spaced border frames, the upper border frame being formed of a tubing of coiled wire; a plurality of large helical springs of uniform size positioned within and between the frames, the said springs being arranged in spaced rows with the springs in one row staggered with respect to the springs in an adjacent row, the springs of the outer rows being secured to the border frames by means of suitable clips, the end springs of the outer rows being positioned in the corners of the border frames, each of said end springs being in contact with and secured to two sides of the border frames, the corners of the border frames conforming in contour to that of the top and bottom convolutions of the said end springs; other helical springs of less size, positioned at the ends of and in alignment with the rows in which the springs are staggered with respect to the outside rows and secured by means of clips at diametrically opposed points to the border frame and end springs of the said aligned rows, flexible coiled tubings of wire disposed between adjacent rows of springs and contacting tangentially with the springs in the rows, the said tubings of wire being terminated at a point lying between the center line of said end springs and the side of the border frame, the said tubings of wire being free from contact with and connection to the border frame; and clips encircling the said tubings of wire and the springs in tangential contact therewith and securing the said springs to the said tubings at diametrically opposed points at the top and bottom of said springs, each of said clips contacting only one of said tubings and one of said springs.

In testimony whereof, I have hereunto affixed my signature.

HARRY E. WOLF.